United States Patent [19]

Chambers et al.

[11] 3,770,411

[45] Nov. 6, 1973

[54] PLANT STIMULANT

[75] Inventors: James C. Chambers, Houston;
William S. Kimbro, Conroe, both of Tex.

[73] Assignee: Organic Laboratories, Inc., Houston, Tex.

[22] Filed: July 29, 1971

[21] Appl. No.: 167,503

[52] U.S. Cl. .................................... 71/24, 71/64 C
[51] Int. Cl. ............................................. C05f 11/00
[58] Field of Search .............................. 71/24, 64 C

[56] References Cited
UNITED STATES PATENTS

| | | | |
|---|---|---|---|
| 3,222,160 | 12/1965 | Ramus | 71/24 X |
| 3,398,186 | 8/1968 | Schwartz | 71/24 X |
| 3,111,404 | 11/1963 | Kaachea et al. | 71/24 |
| 3,544,296 | 12/1970 | Kaachea | 71/24 |
| 3,076,291 | 2/1963 | Gardner | 71/24 X |

*Primary Examiner*—John Adee
*Attorney*—W. F. Hyer et al.

[57] ABSTRACT

A liquid plant growth stimulant and a process for making the same is disclosed in which the stimulant is formed by mixing a crushed humic acid bearing ore first in a quantity of water, then mixing the resulting slurry with a quantity of ammonia, then mixing the resultant slurry with a quantity of phosphoric acid, and if desired, then adding organic trace elements to the resultant mixture.

11 Claims, No Drawings

PLANT STIMULANT

This invention relates to a liquid plant growth stimulant which is formed from a humic acid bearing ore, and to the process of producing the stimulant.

Soil humus is known as an important soil constituent for enhancing growth in plants. However, the humus content of many soils is inadequate and, in these cases, it is desirable to enhance the humus content of the soil by treating it with various organic matter. One approach to improving the humus content of the soil has been to extract humic acid from humic acid bearing minerals and then apply the extracted humic acid in a concentrated form to the soil. One example of this approach is U. S. Pat. No. 3,111,404, issued to John C. Karcher, which relates to the treatment of humic acid bearing ores, such as leonardite, to form a granular ammonia humate fertilizer. However, in that patent, the complexity of the process used to form the humic acid concentrate is such that the end product formed is relatively expensive and the process itself employs expensive and complex machinery. Also, the end product in Karcher is granular and not a concentrated liquid which form would facilitate storage, shipment and handling in acutal use, such as by permitting direct application of the plant stimulant to the soil through an irrigation system. Also, in the Karcher process, other elements which might benefit plant life, such as metallic trace elements are removed because mechanical separation is employed to separate undissolved leonardite constituents.

In Karcher, phosphoric acid is first added during the process to convert the metallic salts of humic acid to humic acid, then ammonia is later added to form ammonium humate, which is then filtered to separate it from the solids present. The ammonium humate liquid is then dried to form a solid ammonium humate, and to reduce the pH of the product to 7. However, this drying procedure is time consuming and requires additional equipment to accomplish it. Also, during the Karcher process, the pH may be so low that constituents that may be beneficial to plant life may be lost.

Another example of the extraction approach is U. S. Pat. No. 2,992,093, issued to E. M. Burdick which also employs expensive and complex equipment to accomplish the extraction process and has the shortcomings noted above.

It is thus an object of this invention to provide a humic acid bearing plant growth stimulant which can be marketed in a concentrated liquid form.

Another object of this invention is to provide such a stimulant which can be formed from readily available earth ores by a relatively simple and inexpensive process.

Another object of this invention is to provide such a process which does not employ mechanical separation so that many constituents of the earth ore that are beneficial to plant life are not lost in the process.

Another object of this invention is to provide such a process in which the pH of the resulting solution can be lowered without drying and use of the equipment associated with a drying procedure.

Another object of this invention is to provide such a process in which throughout the process the pH level is sufficiently neutral to basic so that the constituents of the earth ore are not subjected to strong acids which may cause some forms of the constituents of the earth ore to be lost from the end product.

It is another object of this invention to provide a liquid plant growth stimulant that may be added to the soil without resulting soil or air pollution.

A further object of this invention is to provide such a liquid growth stimulant which may be applied to the soil in relatively small amounts, for example, one or two gallons per acre, and yet will result in enhanced root growth, improved color, improved growth rate and improved germination rate in a relatively short period of time.

These and other objects, advantages and features of the invention are accomplished according to the preferred embodiment of this invention by mixing humic acid bearing ore such as leonardite with water to form a first mixture and agitating this first mixture to substantially wet the ore. The mixture can be made in any type of vessel, and the agitation can be provided by any suitable means, it not being necessary to provide special equipment for this purpose. However, in order to avoid the formation of lumps when the crushed ore is mixed with water, the water should be placed in the mixing vessel first. Then ammonia is added to the first mixture in sufficient amounts to form a second mixture having a pH of about 9 to 14. Again no mechanical separation is required so that special equipment such as centrifuges or filters are not required. The second mixture is then agitated for a time sufficient for the ore to be substantially reacted with the added ammonia, and then phosphoric acid is preferably added to the second mixture in amounts sufficient to substantially neutralize excess ammonia so that the final product has preferably no smell of ammonia, or at least so slight a smell as not to be objectionable to the ordinary home user. It is preferred for this purpose that the amount of added phosphoric acid be sufficient to bring the pH of the mixture into a range of about 6.5 to about 6.9 to form the liquid growth stimulant of this invention. Since the reduction of the pH is formed without drying and a liquid end product is desired, the use of a special drying tower and the time consumed in drying is also avoided. If desired, additional trace elements such as Multi KE-MIN and Iron KE-MIN (trademarks of Georgia Pacific Co., Inc.) may be added to the liquid plant growth stimulant of this invention where the soil to which it is to be applied is lacking in any of these elements.

In another form of this invention, yeast strains may be added to the resultant product of the above described process. Also, if desired, a fertilizer can be added to the liquid growth stimulant formed either singly or in combination with the yeast to provide a wide balance of plant nutriments. It should be noted, however, that if a fertilizer is added to the liquid growth stimulant of this invention, care should be exercised so that the addition does not lower the pH of the solution sufficiently to cause the liquid plant stimulant to form a gel. Also, in the prior described process before the phosphoric acid is added to lower the pH, the ammonia content is such that an objectionable odor is provided. However, in some applications where the ammonia smell is not objectionable and the soil can use excess ammonia, the neutralization step with phosphoric acid may be eliminated. However, even when this is done, trace elements and fertilizer additions may be added as described before.

As can be readily seen, the liquid plant stimulant of this invention can be formed by a relatively simple and inexpensive process using easily obtained and inexpensive equipment. The liquid product formed has been found to be highly beneficial to plant life and to result in relatively rapid stimulation of plant growth, color enhancement and seed germination with the addition of but a relatively small amount of the plant stimulant to the soil being treated. Additional features of the liquid plant growth stimulant of this invention will be apparent to one skilled in the art upon a consideration of the appended claims and the following working examples.

1. Three hundred and sixty gallons of water were added to a 500 gallon reaction vessel having means to agitate its contents and then 30 gallons of the 360 gallons were drawn from the 500 gallon reaction vessel into a 50 gallon side mixing chamber. Then 750 pounds of crushed 30 mesh Carbonox (trademark of the Baroid Co. for its crushed leonardite ore product) were added to the water in the 500 gallon reaction vessel, as the agitating means in the vessel agitated at a suitable rate. The mixture of water and Carbonox formed a slurry or a first mixture which was agitated for about 20 minutes until the Carbonox was substantially wetted. Then 400 pounds of a solution having a 21 percent ammonia concentration (aqueous ammonia) was then added to the slurry, first in relatively large amounts and then in relatively smaller amounts until a desired pH of about 10 was reached, as determined by a pH meter, thus forming a second mixture containing water, Carbonox and ammonia. This second mixture was agitated for about 45 minutes to allow a substantially complete reaction of the mixture. It should be understood that atmospheric conditions and temperature can cause this agitation time to vary in order to assure complete reaction. For example, on cold days up to 2 hours may be required while on hot days less time may be required to get a substantially complete reaction. If a slight excess of ammonia is added, the excess ammonia can be compensated for by adding more acid during the acid addition step of this process which follows. Then 50 pounds of Multi KE–MIN and 50 pounds of Iron KE–MIN were mixed into the 30 gallons of water in the 50 gallon side mixing chamber and agitated until the KE—MINs were substantially completely wetted. The KE—MIN and water slurry were then added to the 500 gallon vessel containing the second mixture, and they were agitated until evenly mixed to form a third mixture. Then a solution of 280 pounds of 75 percent concentration phosphoric acid was added to the third mixture first in relatively large quantities and then in relatively smaller quantities until the pH meter showed a desired end point pH of about 6.5 to about 6.9, thus forming a fourth mixture. The fourth mixture was then agitated for about 20 to 30 minutes, and the pH was continually checked to be sure it did not go below a pH of 6.1. The control of the pH during the acid addition step was watched and controlled very closely because an excess addition of phosphoric acid producing a pH below 6.1 would cause the fourth mixture to form a thick jelly in the reaction vessel. After the fourth mixture had been agitated for the 20 to 30 minutes time period, it was pumped out of the 500 gallon reaction vessel into containers ready for shipment or for application to plants.

The product of the process from example 1 was used on a test group of Louisiana yams, and the results show that very small dosages of the growth stimulant of this invention resulted in significant beneficial effects to the yams. For example, sprouted young yam plants of a test group were sprayed with a mixture of two gallons of plant stimulant dissolved in 50 gallons of water per acre, and the young yam plants of a control group were just sprayed with 50 gallons of water per acre containing no plant stimulant. The test group yam plants produced three to four times as many young yam slips for replanting as did the control group. The yield of the 20 test rows of young yam slips sprayed with the plant stimulant, produced enough replanting slips to plant 25 acres where the control group required 140 rows to plant 25 acres. After replanting, plants from the test group which had been treated with the stimulant, and the control group which had not been treated with the stimulant, were compared after about seven days and those plants of the test group showed vastly superior root systems of the order of three to four times more intense. Also, the transplanted plants were treated with a mixture of 2 gallons of plant stimulant to 500 gallons of water, and these plants were transplanted during a very hot summer day without any noticeable replanting shock.

2. Three hundred and sixty gallons of water were added to a 500 gallon reaction vessel having means to agitate its contents. While the means in the vessel were agitating at a coordinated rate with the addition rate of the Carbonox, such that the Carbonox and water were mixed without the formation of lumps; 750 pounds of crushed 30 mesh Carbonox were added to the water to form a first mixture. The first mixture was then agitated for about 20 minutes, in which time the Carbonox ore was substantially completely wetted. Then 400 pounds of aqua ammonia solution having a 21 percent ammonia concentration was added to the slurry, first in relatively large amounts and then in relatively smaller amounts until a desired pH of about 10 was reached as determined by a pH meter, thus forming a second mixture. The second mixture was agitated for about 45 minutes to allow a substantially complete reaction of the mixture. Again, it should be understood that atmospheric conditions and temperature can cause the time required to get substantially complete reaction in the second mixture to vary as previously noted. Once the reaction was completed the second mixture was ready for use as a plant stimulant. Of course, because phosphoric acid was not added to neutralize the ammonia, the resulting second mixture had a strong ammonia smell. However, the solution formed is still beneficial to plant life and is suitable for use in large commercial applications where the ammonia smell would be less objectionable as opposed to home and garden use.

The reactive product of example 2 was used on a test group of rice seeds, and the results showed that very small amounts of the plant stimulant of this invention greatly affect plant growth. For example, by using one-half teaspoon of the present stimulant mixed in one pint of water and soaking test rice seeds overnight in this solution prior to their being planted, these seeds germinated in 4 days whereas a control group of rice seeds similarly treated, except that the liquid plant stimulant of this invention was not applied, did not germinate for an average of 12 to 15 days. The test group also showed a more intense root system than the control group.

3. The process steps of the example 2 process were repeated, but a further step of adding 100 pounds of organic trace elements such as 50 pounds of Multi KE—MIN and 50 pounds of Iron KE-MIN to the second mixture was carried out before the stimulant was readied for application to plants. However, prior to the organic trace element additions to the second mixture, they were thoroughly mixed in a 50 gallon side reaction vessel containing 30 gallons of water.

The product of process example 3 was used on a test group of Bermuda grass acreage, and the results show that small amounts of the plant stimulant produce beneficial plant stimulation. For example, using a dosage of 2 gallons of the plant stimulant to the acre, the stimulant was applied to the Coastal Bermuda test group, and the test group showed an increase in thickness of yield in the order of two to three times that of the control group of Coastal Bermuda grown under identical conditions except that the liquid plant stimulant of this invention was not applied to it. Also, the test group showed more intense color than the control group.

4. The process steps of example 1 were repeated, but a further step of adding fish emulsions and yeast strains in a weight ratio of 1L1 to the fourth mixture was carried out before the stimulant was ready for application to plants.

The product of process example 4 was applied to a test group of Gotu Kola plants at a dosage of 2 gallons of plant stimulant to the acre, and the growth of these plants was compared to a control group of Gotu Kola plants grown under identical conditions except that the liquid plant stimulant of this invention was not applied to them. Gotu Kola plants, which are from Ceylon, normally will not grow except in exceptionally high humidity, and during the test period the control group plants showed no growth. However, during this period the test plants (being in the same environment) showed growth and improved root systems, thus demonstrating the beneficial results obtained by use of the present invention.

Broadly, the present invention contemplates providing a highly concentrated organic plant stimulant which, even when used in very small dosages, produces significant plant stimulation. In general, such a concentrated plant 1:1 can be made by the steps of making a slurry of humic acid bearing ore and water, with the amount of humic acid ore added being the smallest effective amount to produce plant stimulation up to the maximum amount of humic acid bearing ore which would be at least in colloidal suspension in the slurry (and possibly a portion or all is completely in solution in the slurry) when the pH of said slurry is raised to about 9 to 14 by an ammonia addition to said slurry. Whether in colloidal suspension or in solution, the important factor is that the amount of crushed ore in a particular slurry be such that it does not settle to the bottom of the tank in any significant amount. The amount of ammonia used in the above said ammonia addition is an effective amount up to about 4 percent of the composition by weight to produce the desired pH of about 9 to 14. After the 9 to 14 pH range is obtained, the ammoniated slurry is generally agitated until substantially complete reaction occurs in the mixture. The time required to obtain substantially complete reaction will vary with atmospheric conditions, but generally it will range from 10 minutes to 2 hours. Then acid is added to the substantially reacted 9 to 14 pH mixture in sufficient amounts to produce a pH of about 6.5 to about 6.9. The amount of phosphoric acid required to produce a 6.5 to about 6.9 pH will vary from an effective amount up to about 6 percent of the composition by weight. Then, generally, there is added organic trace elements in effective amounts up to about 3 percent of the total composition by weight to enhance plant life.

It should also be understood by those skilled in the art that the humic acid bearing ore can be first treated with ammonia and then dissolved in water without departing from the scope of this invention or from the objects and advantages thereof.

From the foregoing, it will be seen that this invention is one well adapted to attain all of the ends and objects hereinabove set forth, together with other advantages which are obvious and which are inherent to the method and the reactant composition.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

The invention having been described, what is claimed is:

1. The method of making a plant nutriment which comprises the steps of:
   a. placing a quantity of water into a vessel;
   b. admixing crushed humic acid bearing ores in an amount such that said ores are substantially suspended in said mixture after said mixture is ammoniated into said water contained in said vessel to obtain a first mixture;
   c. agitating said first mixture until said ore is substantially completely wetted;
   d. adding ammonia to said wetted first mixture in said vessel to obtain a second mixture having a pH range of 9 to 14;
   e. agitating said second mixture in said vessel for a time sufficient for said ore to be substantially reacted with said ammonia, wherein the product is a liquid including suspended matter for benefiting plant life formed without extracting any significant amount of the added constituents that are beneficial to the plant life; and
   f. adding phosphoric acid to said second mixture in said vessel in an amount to bring the pH of the second mixture into a range of pH substantially less than 9 but greater than not substantially less than about 6.5, and effective to substantially neutralize excess ammonia in said second mixture.

2. The method of claim 1 wherein said ore is leonardite.

3. The method of claim 1 further including the step of adding organic trace elements to one of said first or second mixture in small but effective amounts up to about 3 percent of the total composition weight to enhance plant growth.

4. The method of claim 1 further including the step of adding phosphoric acid to said second mixture in said vessel in an amount sufficient to bring the pH of said mixture into a range of about 6.5 to about 6.9.

5. The method of claim 1 further including the step of adding strains of yeast to one of said first or second mixture in said vessel in small but sufficient amounts to produce beneficial results in plant life.

6. The method of claim 1 wherein said quantity of water is about 360 gallons; said quantity of humic acid bearing ore is approximately 750 pounds; said quantity of ammonia added is an effective amount up to about 200 pounds to produce a pH of 9 to 14; and said time sufficient for said ore to be substantially reacted with said ammonia being about 30 minutes.

7. The method of claim 6 wherein said second mixture is agitated for at least 10 minutes to 2 hours.

8. The method of claim 6 further including the step of adding phosphoric acid to said second mixture in said vessel in an effective amount up to about 200 pounds to produce a pH of about 6.5 to about 6.9 in said mixture.

9. The method of claim 6 further including the step of adding organic trace elements to one of said first or second mixtures in small but effective amounts up to about 100 pounds, to enhance plant life.

10. The method of claim 6 further including the step of adding strains of yeast to one of said first or second mixtures in effective amounts up to a weight ratio of 1 to 1 with said mixture to which it is added.

11. A liquid composition of matter for plant stimulation made from a process comprising the steps of:

a. placing a quantity of water into a vessel;
b. admixing crushed humic acid bearing ores in an amount such that said ores are substantially suspended in said mixture after said mixture is ammoniated into said water contained in said vessel to obtain a first mixture;
c. agitating said first mixture until said ore is substantially completely wetted;
d. adding ammonia to said wetted first mixture in said vessel to obtain a second mixture having a pH range of 9 to 14;
e. agitating said second mixture in said vessel for a time sufficient for said ore to be substantially reacted with said ammonia, wherein the product is a liquid including suspended matter for benefiting plant life formed without extracting any significant amount of the added constituents that are beneficial to the plant life; and
f. adding phosphoric acid to said second mixture in said vessel in an amount to bring the pH of the second mixture into a range of pH substantially less than 9 but greater than not substantially less than about 6.5, and effective to substantially neutralize excess ammonia in said second mixture.

* * * * *